(12) United States Patent
Melkote et al.

(10) Patent No.: US 9,384,455 B2
(45) Date of Patent: *Jul. 5, 2016

(54) ON-LINE INVENTION DISCLOSURE SYSTEM

(75) Inventors: Anuradha Narasimhaswamy Melkote, Farmington Hills, MI (US); Damian Porcari, Farmington Hills, MI (US); Kelly Anne Slank, Troy, MI (US)

(73) Assignee: Anaqua, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/117,435

(22) Filed: May 27, 2011

(65) Prior Publication Data

US 2011/0231220 A1 Sep. 22, 2011

Related U.S. Application Data

(63) Continuation of application No. 09/552,131, filed on Apr. 19, 2000, now abandoned.

(51) Int. Cl.
*G06F 17/30* (2006.01)
*G06Q 10/06* (2012.01)
*G06Q 10/10* (2012.01)
*G06Q 50/18* (2012.01)

(52) U.S. Cl.
CPC ...... *G06Q 10/06311* (2013.01); *G06Q 10/1095* (2013.01); *G06Q 50/184* (2013.01)

(58) Field of Classification Search
CPC .......... G06F 17/30286; G06F 17/30067; G06F 3/067; G06F 17/30575; G06F 17/30345; G06F 17/00; G06Q 10/10; G06Q 10/06311; G06Q 50/184; G06Q 10/1095; G06Q 50/00; G06Q 10/00; H04R 29/00; H04B 7/00

USPC ........ 707/770, 709, 748, 805, 638, 609, 812, 707/E17.005; 715/273, 234, 229, 237; 705/1.1, 310, 26.82, 7.19, 7.13, 75, 705/317, 40, 51, 52, 44; 713/181, 180, 176, 713/165, 201, 166, 162

See application file for complete search history.

(56) References Cited

U.S. PATENT DOCUMENTS

| 4,687,317 | A | * | 8/1987 | Appel ............... G03G 15/5016 399/183 |
| 4,981,370 | A | * | 1/1991 | Dziewit et al. ............... 713/176 |
| 5,247,661 | A | * | 9/1993 | Hager et al. ........... 707/999.104 |
| 5,276,869 | A | * | 1/1994 | Forrest et al. ......... 707/E17.008 |

(Continued)

FOREIGN PATENT DOCUMENTS

| GB | 2368674 | 5/2002 |
| NL | 9100425 | 3/1991 |

OTHER PUBLICATIONS

Joseph P. Kates—"Computer Patent Disclosures"—Communications of the ACM—vol. 7 / No. 10 / Oct. 1964—pp. 578-579.*

(Continued)

*Primary Examiner* — Anh Ly
(74) *Attorney, Agent, or Firm* — Brooks Kushman P.C.

(57) ABSTRACT

An on-line invention disclosure system includes a user computer, a server and a database coupled to the server. The server provides user screens to the user to prompt the users to provide disclosure information to the server. The server receives the disclosure information from the users and stores the information in the database while allowing access to the database after storing the information on the database.

19 Claims, 4 Drawing Sheets

(56) References Cited

U.S. PATENT DOCUMENTS

| | | | | |
|---|---|---|---|---|
| 5,315,504 | A * | 5/1994 | Lemble | G06Q 10/10 700/90 |
| 5,317,683 | A * | 5/1994 | Hager | G06Q 10/109 715/751 |
| 5,354,001 | A | 10/1994 | Hasegawa | |
| 5,377,355 | A * | 12/1994 | Hager | G06Q 10/10 707/E17.008 |
| 5,390,296 | A * | 2/1995 | Crandall | G06F 15/0225 715/213 |
| 5,418,802 | A | 5/1995 | Chwalek | |
| 5,606,609 | A * | 2/1997 | Houser | H04L 9/3236 382/306 |
| 5,654,886 | A * | 8/1997 | Zereski, Jr. | G01W 1/10 702/3 |
| 5,758,095 | A | 5/1998 | Albaum et al. | |
| 5,774,833 | A * | 6/1998 | Newman | 704/9 |
| 5,809,318 | A * | 9/1998 | Rivette | G06F 13/4063 707/E17.008 |
| 5,850,219 | A * | 12/1998 | Kumomura | 715/751 |
| 5,852,219 | A * | 12/1998 | Sauer | B01J 23/30 423/606 |
| 5,875,431 | A | 2/1999 | Heckman et al. | |
| 5,982,931 | A * | 11/1999 | Ishimaru | 382/218 |
| 5,991,733 | A * | 11/1999 | Aleia et al. | 705/7.13 |
| 6,026,436 | A * | 2/2000 | Hawes | G06F 17/218 709/218 |
| 6,067,531 | A * | 5/2000 | Hoyt et al. | 705/35 |
| 6,151,599 | A | 11/2000 | Shrader et al. | |
| 6,161,113 | A * | 12/2000 | Mora et al. | 715/234 |
| 6,182,078 | B1 * | 1/2001 | Whitmyer, Jr. | 705/26.1 |
| 6,219,680 | B1 * | 4/2001 | Bernardo et al. | 715/234 |
| 6,247,032 | B1 * | 6/2001 | Bernardo et al. | 715/234 |
| 6,298,327 | B1 * | 10/2001 | Hunter et al. | 705/1.1 |
| 6,314,425 | B1 * | 11/2001 | Serbinis | G06F 17/3089 715/205 |
| 6,339,767 | B1 * | 1/2002 | Rivette et al. | 707/781 |
| 6,341,352 | B1 | 1/2002 | Child et al. | |
| 6,408,330 | B1 * | 6/2002 | DeLaHuerga | A61J 1/1437 709/217 |
| 6,434,580 | B1 * | 8/2002 | Takano et al. | 715/255 |
| 6,442,595 | B1 * | 8/2002 | Kelly | H04N 1/00209 709/206 |
| 6,449,598 | B1 * | 9/2002 | Green et al. | 705/51 |
| 6,622,015 | B1 * | 9/2003 | Himmel | G06Q 20/32 455/412.1 |
| 6,684,369 | B1 * | 1/2004 | Bernardo et al. | 715/205 |
| 6,714,915 | B1 * | 3/2004 | Barnard et al. | 705/7.13 |
| 6,832,202 | B1 * | 12/2004 | Schuyler et al. | 705/7.26 |
| 6,907,529 | B1 * | 6/2005 | Hirose | 713/176 |
| 6,912,660 | B1 * | 6/2005 | Petrogiannis | 713/181 |
| 6,918,082 | B1 * | 7/2005 | Gross et al. | 715/206 |
| 7,016,851 | B1 * | 3/2006 | Lee | 705/310 |
| 7,055,106 | B2 | 5/2006 | Shibata | |
| 7,069,592 | B2 * | 6/2006 | Porcari | 707/999.001 |
| 7,117,165 | B1 * | 10/2006 | Adams et al. | 705/26.4 |
| 7,200,808 | B1 * | 4/2007 | Nagao | G06F 3/0481 707/999.01 |
| 7,257,764 | B2 * | 8/2007 | Suzuki et al. | 714/774 |
| 7,437,304 | B2 * | 10/2008 | Barnard et al. | 705/7.15 |
| 7,584,250 | B1 * | 9/2009 | Chapman et al. | 709/206 |
| 7,610,233 | B1 * | 10/2009 | Leong et al. | 705/37 |
| 7,634,415 | B2 * | 12/2009 | Baker et al. | 705/1.1 |
| 7,640,318 | B1 * | 12/2009 | Hull | G06F 17/30011 707/999.2 |
| 2001/0037460 | A1 * | 11/2001 | Porcari | 713/201 |
| 2001/0039505 | A1 * | 11/2001 | Cronin | 705/7 |
| 2001/0049707 | A1 * | 12/2001 | Tran | 707/530 |
| 2002/0002523 | A1 * | 1/2002 | Kossovsky et al. | 705/36 |
| 2002/0072920 | A1 * | 6/2002 | Grainger | G06Q 10/10 705/310 |
| 2002/0091725 | A1 * | 7/2002 | Skok | G06F 17/24 715/234 |
| 2002/0095368 | A1 * | 7/2002 | Tran | 705/37 |
| 2002/0116509 | A1 * | 8/2002 | DeLaHuerga | 713/176 |
| 2003/0177051 | A1 * | 9/2003 | Driscoll | G06Q 20/102 705/40 |
| 2003/0195764 | A1 * | 10/2003 | Baker et al. | 705/1 |
| 2005/0091338 | A1 * | 4/2005 | de la Huerga | A61J 1/1437 709/217 |
| 2005/0171947 | A1 * | 8/2005 | Gautestad | G06F 17/3089 707/E17.116 |
| 2006/0010377 | A1 * | 1/2006 | Anecki et al. | 715/530 |
| 2006/0031092 | A1 * | 2/2006 | Cronin | 705/1 |
| 2006/0173703 | A1 * | 8/2006 | Lee | 705/1 |
| 2006/0190443 | A1 * | 8/2006 | Mathews et al. | 707/3 |
| 2006/0190807 | A1 * | 8/2006 | Tran | 715/500 |
| 2006/0224412 | A1 * | 10/2006 | Frank et al. | 705/1 |
| 2008/0022100 | A1 * | 1/2008 | Ginter et al. | 713/168 |
| 2011/0066665 | A1 * | 3/2011 | Narasimhaswamy Melkote | G06F 17/30 707/812 |
| 2011/0231220 | A1 * | 9/2011 | Melkote et al. | 705/310 |
| 2011/0258227 | A1 * | 10/2011 | Lacasse | G06F 17/3069 707/769 |
| 2013/0173535 | A1 * | 7/2013 | Melkote | G06F 17/30011 707/609 |
| 2015/0295933 | A1 * | 10/2015 | Rogosnitzky | G06F 17/30371 707/785 |

OTHER PUBLICATIONS

James F. Cottone—"Writing an Invention Disclosure"—IEEE Transactions on Professional Communication. Published in: Professional Communication, IEEE Transactions on Jun. 1979—(vol. PC-22 , Issue: 2) pp. 105-108.*

* cited by examiner

ON-LINE INVENTION DISCLOSURE SYSTEM

CROSS-REFERENCE TO RELATED APPLICATION

This application is a continuation of application Ser. No. 09/552,131, filed Apr. 19, 2000, the disclosure of which is incorporated by reference herein in its entirety.

TECHNICAL FIELD

The present invention relates to an improved data processing system, and more particularly, to an on-line invention disclosure submission system.

BACKGROUND

In many companies, paper submission of forms such as invention disclosures are routinely used. Commonly these paper disclosures are mailed to a central location where they are logged into a system and provided to a patent coordinator or the corporate attorney. In large companies having several offices, these invention disclosures are mailed to the patent department or the patent coordinator. The paper systems are burdensome on staff and the disclosure documents may be subject to loss, misplacement or a misrouting error.

Therefore, there is a need to provide a substantially automated invention disclosure submissions process. Various aspects of such a process may be found in U.S. Pat. Nos. 5,247,661, 5,276,869, 5,317,683, and 5,377,355. These patents all describe various aspects of a data processing system. One drawback to this system described in these patents is that it is an electronic mail (E-mail) based system. Documents are transmitted back and forth between various locations. The system requires client software on individual user machines. This is particularly cumbersome in a large corporate environment having multiple locations in multiple countries. The drawback being that as migration to new updated software packages is performed, the users in all locations may not have the proper software to access the system. Therefore, certain disclosures may not ever be made due to the inconvenience. The prior patents also describe that the documents are transmitted to each user's machine for processing. Such a system, however, requires high bandwidth to support the exchange of documents from the central location to the user. Such a system, particularly in large corporations, is impractical since large bandwidth allocations for such a system are not desirable ways to use system resources.

It would therefore be desirable to provide an on-line invention disclosure system that does not require high bandwidth for each user to have special software.

Corporate patent departments also typically maintain a docketing system. The docketing system keeps track of the disclosures as they are processed by the patent department. The docketing system maintains the status of disclosures for the patent attorneys and patent coordinators and of any patent applications originating therefrom. Various due dates of the docket system are also tracked. Typically, inventors must call the patent department to determine the status of their invention disclosure because the docket system is inaccessible to them. This process is also time consuming for staff. It would therefore be desirable to provide a system capable of automatically notifying and/or allowing inventors to access some or all of the information in a corporate docketing system so that the status may be readily determined by the inventors.

Typically, invention disclosures are searched prior to preparing a patent application therefrom. Commonly, the disclosures are read and a computer or manual search is performed sometime after the disclosure is submitted. Also, the inventors typically have little input to the process. It would also be desirable to perform a search during the invention disclosure submission process. Consequently, it would also be desirable to allow the inventor to participate or help direct the search.

In paper type systems and in the systems above, one inventor is responsible for preparing the invention disclosure document. It is presumed that concurrence has been achieved between the author of the invention disclosure and the other inventors. Oftentimes this is not achieved and the invention disclosure is processed according to company policies without concurrence. It would therefore be desirable to provide an automated invention disclosure system that does not allow the disclosure to be processed until concurrence has been reached by each of the inventors.

SUMMARY OF THE INVENTION

It is therefore one object of the invention to provide an automated invention disclosure system that overcomes the drawbacks of prior known systems. The present invention provides a web based on-line invention disclosure system that may, for example, be used in cooperation with a corporate intranet.

In one aspect of the invention an on-line invention disclosure system includes a user computer, a server and a database coupled to the server. The server provides user screens to the user to prompt the users to provide disclosure information to the server. The server receives the disclosure information from the users and stores the information in the database while allowing access to the database after storing the information on the database.

In a further aspect of the invention, a method for forming an invention disclosure comprises:

forming an invention disclosure online by entering a plurality of selected information into a web-based system;

as the plurality of selected information is entered, storing the information in a central storage location; and allowing access to various users for reviewing the information.

One advantage of the invention is that the system is platform independent. That is, PC, Mac or UNIX based terminals may all access the web based on-line disclosure system. Another advantage of the present invention is that the document resides in one location and may be "viewed" by the inventors, the corporate patent staff, and evaluation committee members. The document itself does not actually get transferred as in the E-mail based systems.

Another advantage of the invention is that inventors may access predetermined information from an on-line docketing system. Also, the docketing system may obtain invention information from the on-line docket system.

Another advantage of the invention is that evaluation committee members may automatically receive notices that invention disclosures are ready to be evaluated.

Other objects and features of the present invention will become apparent when viewed in light of the detailed description of the preferred embodiment when taken in conjunction with the attached drawings and appended claims.

DESCRIPTION OF THE PREFERRED EMBODIMENT

Figure 1:
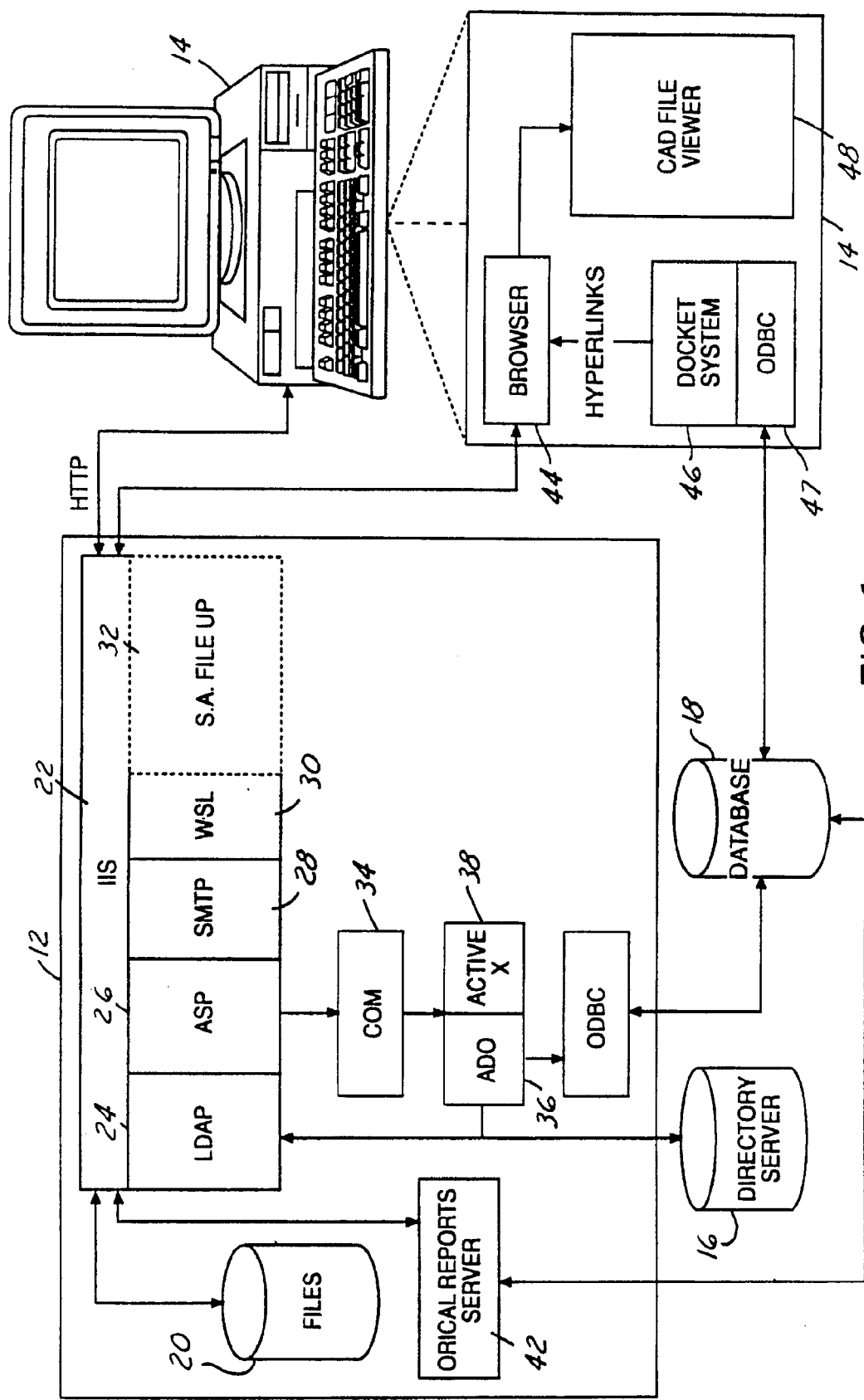
FIG. 1 is a high level block diagram of a disclosure system according to the present invention.

In the following figures the same reference numerals will be used to identify the same components in the various views. Various examples and parameters are set forth in the following description. These are meant to be by way of example and not meant to limit the scope of the invention.

Referring now to FIG. 1, an on-line invention disclosure system 10 is illustrated. On-line disclosure system 10 is a web based system having a web server 12 that is coupled to a plurality of users, one of which is shown as user computer 14. The web server 12 as will be further described below may be coupled to a directory server 16 containing user information and to a database system 18. Database 18 may contain both docketing information and disclosure information. Although illustrated as one, database 18 may be comprised of two or more databases that are linked together. Various tables are established in database 18 and some of the information located in the docket tables may be linked with the disclosure tables as will be further described below.

Web server 12 has a file memory 20 that stores various files therein. Memory 20 is coupled to the Internet Information Server (IIS) 22. IIS 22 controls the operation of the system. IIS 22, for example, may have a lightweight directory access process (LDAP) 24, active server pages (ASP) 26, send mail transfer protocol (SMTP) 28, web single login (WSL) 30, and SAFile-up 32.

LDAP 24 is a protocol for accessing directory server 16. The LDAP 24 permits the retrieval of various user information from the directory server such as the employee's location, phone numbers, etc. in response to the entry of identification information. ASP 26 provides the scripts for the various pages that are viewed by the user. The scripts also control how the information is retrieved from the database 18 and how information is stored therein. Various scripts may be used for various situations in various companies. Preferably, the scripts prompt the user for a complete disclosure that may include a brief summary of the problem solved and a description of the present solution and how it solves the problem. Of course, numerous other categories of information may be prompted.

SMTP 18 provides the formatting for the company specific E-mail system. Various types of E-mail formatting would be evident to those skilled in the art. WSL 30 provides an identification subsystem whereby identification information such as the user's corporate ID and password are authenticated. A password may be established for each disclosure during the initial entry into the system. Thereafter, the password may be used to view the disclosure and view the status thereof. SAFile-up 32 is a software package provided by software artisans that allows the user's PC to couple various documents to the invention disclosure. LDAP 24 is coupled to directory server 16.

ASP 26 is coupled to COM 34. COM 34 are the objects run on server 12. COM 34 is coupled to ADO 36 which is coupled to Active X 38. ADO 36 and Active X are known types of object formatting that allow the information to be displayed in a convenient format. ADO 36 is coupled to ODBC 40, a known type of database driver. ODBC 40 is coupled to docket system 18.

IIS 22 may also be coupled to a report server 42. Report server 42 may be coupled to docket system 18. Report server 42 provides printable reports to the various system users.

IIS 22 may also be coupled to user computer 14 that has a browser 44, a docket system program 46 that is coupled through an ODBC 47 to docket system 18. Browser 44 may be one of the many types of web browsers currently available that is capable of communicating through the common http protocol. The patent staff and patent coordinators may be the only users with direct access to the docket database through docket system program 46 and ODBC 47. Typical users may obtain selected docket information from the docket system through server 12 as will be described below. Browser 44 may also be coupled to a CAD file viewer 48. Some computer aided design (CAD) systems may require an interface to operate with a web browser. CAD file viewer 48 may be one of such systems typically employed on these types of machines. Generally, as will be further described below, the web server 12 retains the various documents while user computers 14 may view selected portions of the document without having to transmit the document back and forth between various users.

Figure 2:
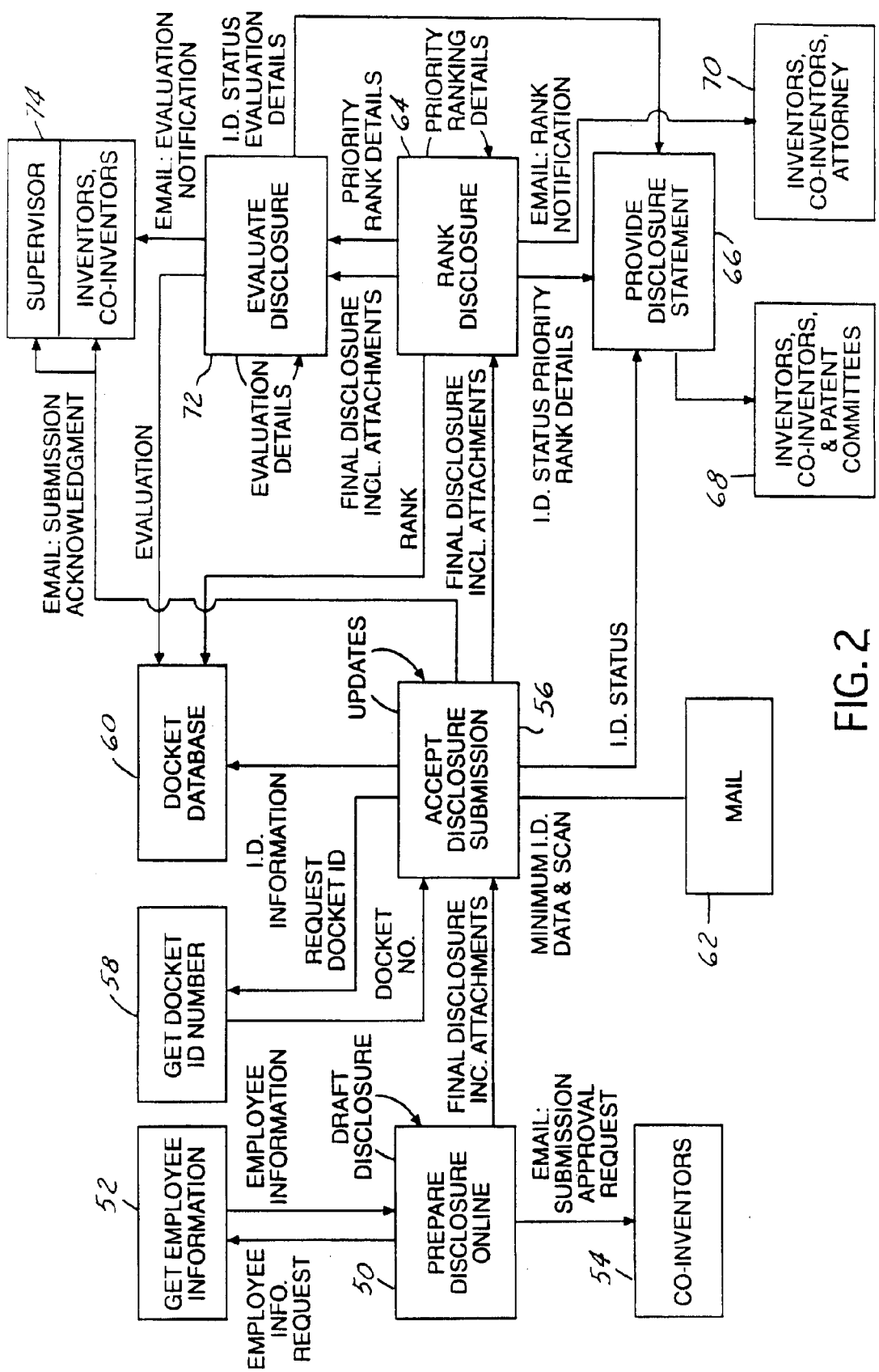
FIG. 2 is a functional flow chart of a disclosure system according to the present invention.

Referring now to FIG. 2, a block diagram of the process of the present invention is illustrated. As is described below, a user may be an inventor or just an author delegated by the inventor. User and inventor are used interchangeably because in most circumstances the user is the inventor. The author system allows company personnel to place inventions by non-company personnel in the system. In block 50, the disclosure is prepared on-line. Passwords or other security measures may be employed through the identification subsystem before access to the system may be gained. Preferably, a corporate directory service or other directory information may be used to assist the user in filling out the disclosure. For example, a get employee information block 52 may be coupled to the prepare disclosure on line block 50 to provide the user information at the user's request in response to some identification information such as an E-mail ID, an employee number or the like. This employee user information thus gets associated with the particular disclosure being prepared. Block 50 may also allow the user to couple in other co-inventors and request approval from co-inventors in block 54. The co-inventors of block 54 are preferably notified via an E-mail that a request for approval has been requested for an invention disclosure that has been prepared naming them as a co-inventor. For convenience, the notification may include a hyperlink so that the disclosure and a connection with the server may be obtained. In block 50, the inventor may be asked to fill in predetermined disclosure information such as a brief description or comments, comment on prior art, give a brief description on the new technology provided by the invention, various invention dates, provide classification information such as company classification codes, and miscellaneous other invention information such as whether a government contract was used or if the invention was disclosed to non-company personnel. The prepare disclosure on-line block 50 may also inquire whether other documents exist so that they may be attached to the disclosure as file attachments. The file attachments may be word processing documents, CAD files, presentation documents or various other types of documents.

When approval has been obtained from the co-inventor and the inventors, the accept disclosure submission block 56 gets a docket ID number from a docketing system 58. The disclosure system makes the request and the docket system provides the next available docket number. The docket system in block 60 may also be linked to provide various other information from the on-line invention disclosure system 10.

In addition to accepting disclosures through an on-line system 56, provisions may also be made for accepting mail-in disclosures as was traditionally done. In this manner, the disclosures may be scanned into the system by the patent staff but are received from mail block 62.

Once the disclosure information has been finalized and accepted, block 64 may be performed wherein the disclosures may be ranked. An evaluator may receive an E-mail notice that a disclosure is available in his technology area. The disclosures may be ranked by a patent committee that looks at the priority ranking criteria and evaluates the disclosure accordingly. These details may vary depending on the company. The evaluation may be provided to the docket database in block 60.

Once ranked, the inventors may view the ranking in block 66. By logging on to the system through a web browser or other method, the inventors may monitor the invention disclosure through the process. Various inventors, co-inventors and patent committees in block 68 may be provided various information on the status of the disclosure. This may be done automatically as standardized letters generated by the server 12 or through an E-mail with a hyperlink to the disclosure or the status information. The ranking of the disclosure may also be provided to inventors, co-inventors, and the attorneys responsible in block 70.

After ranking, the responsible attorney may evaluate the invention disclosure in block 72 for patentability. Block 72 is coupled to block 66 so that the disclosure evaluation status may also be provided to inventors, co-inventors and patent committees in block 68. The evaluation of the disclosure may also be provided to the docket database 60. The evaluation of the disclosure in block 72 and the disclosure submission 56 may be provided to a supervisor, inventor or co-inventor by way of E-mail in block 74. The E-mails preferably contain hyperlinks so that the invention may be easily viewed by clicking on the hyperlink. Further details of the system are described further below.

Figure 3:
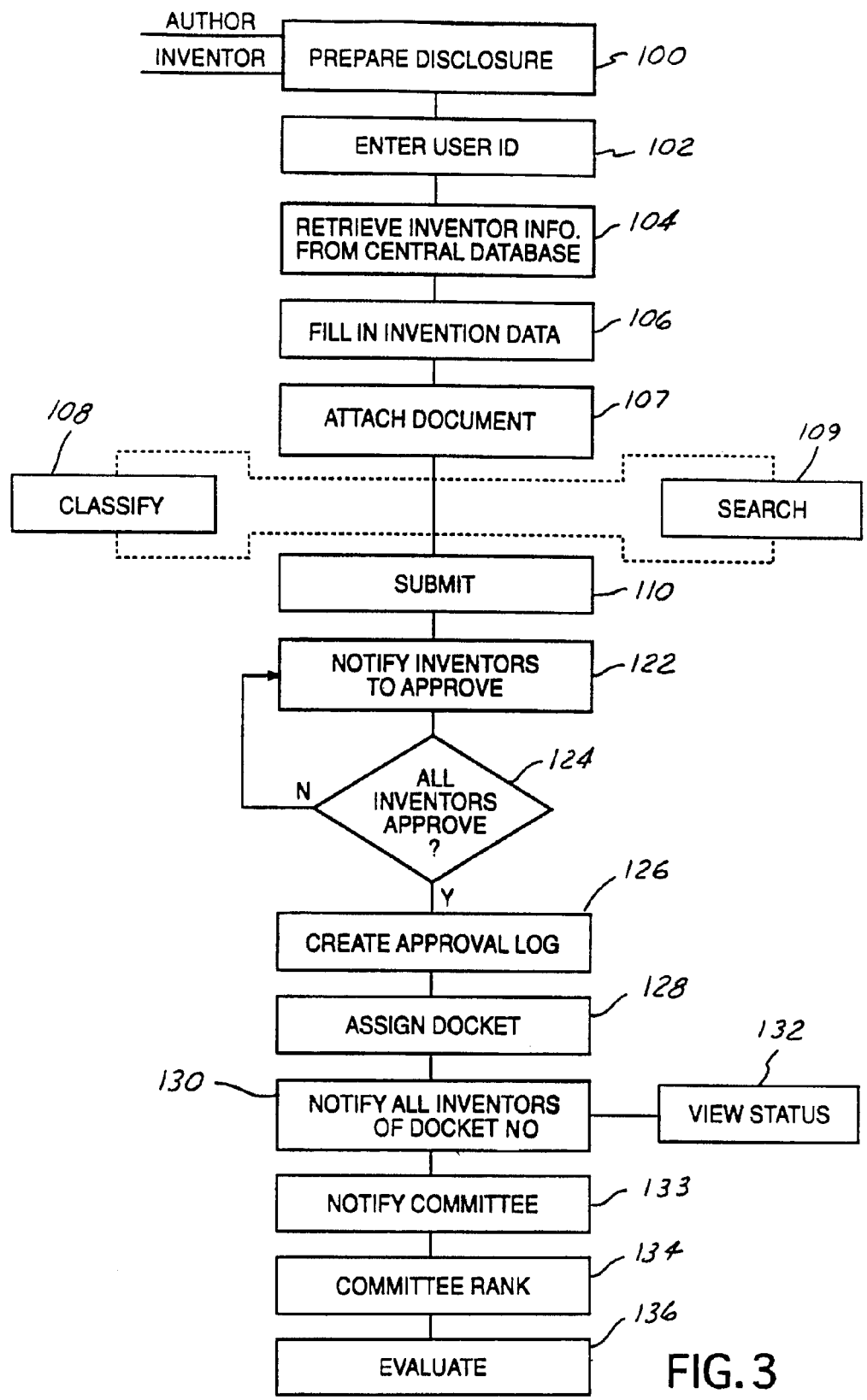
FIG. 3 is a flow chart of the operation of a disclosure system according to the present invention.

Referring now to FIG. 3, the invention disclosure is prepared on-line in step 100. An author or inventor may prepare the invention disclosure. Preferably, the author or inventor or both obtain access through a corporate intranet. In step 102, the user enters identification information (ID) for the system. This may also consist of a password or other security if this is a subsequent access to the system. The following, however, is based upon an initial submission of an invention disclosure. In step 104, the information may be received from a central database or directory server maintained by the company. Various invention data is filled into the disclosure in step 106. As described above, the invention data is preferably as detailed information as the inventor may provide. The invention data may be prompted from the on-line disclosure system through a series of direct questions and answers, or the user may be directed to various segments where broad questions are answered and the inventor may expound, or a combination of both. In step 107, if any documents such as prints, flow charts, CAD files or other information would be helpful to the preparation of a patent application from the disclosure, the documents may be attached so that they are stored in the system with the disclosure.

Optional steps 108 and 109 may also be performed. Step 108 classifies invention disclosure based on the information filled therein. Step 108 is further described below. In step 109, a search may be prompted using the various information from the system. The search may also interact with the inventor to determine whether the search is finding appropriate information. The search step 109 also is further described below.

In step 110, the invention disclosure is submitted by the author. This submission is an approval by the author/inventor. In step 122, the other inventors are notified to approve the invention disclosure. As mentioned above, the notification may be an E-mail with a hyperlink to the disclosure on the on-line system in a web based manner. In step 124, if all inventors do not approve the disclosure then step 122 is executed again. If other inventors change the invention disclosure then approval for the changed draft should be obtained from all other inventors including the authoring inventor. Preferably, an approval log becomes associated with the invention disclosure once all the inventors approve the invention disclosure in step 126. Approval in step 124 may also entail a variety of other functions including signing or agreeing to an associated document such as an assignment of the invention, a power of attorney or other bookkeeping functions.

After approval, the disclosure officially becomes part of the system by receiving a docket number assigned in step 128 so that tracking may be provided. The docket number is obtained from the docket system. In step 130, all inventors are notified of the docket number. The inventors may view the status in step 132 of the docket. Preferably, notification takes place by way of E-mail and may have a predetermined letter with a hyperlink therein. The hyperlink may be used to provide quick access to the system through the corporate intranet or the Internet.

In step 133, an invention ranking committee or committees are notified to rank the invention disclosure. If a number of committees are used, the proper committee may be assigned by the corporate classification code entered by the inventor/author. The committee ranks the disclosure in step 134. The system may also set an evaluation meeting of various committee members to rank the disclosure. To view the disclosure the committee members may click on a hyperlink from an E-mail or otherwise access the invention disclosure system. A ranking sheet or screen with various ranking criteria may become associated with the disclosure. The committee ranking may be provided to the inventors through notification such as an E-mail or the disclosure may be accessed by the inventors from a previous notification.

In step 136, the invention disclosure may be automatically assigned to a member of the patent staff for evaluation based upon the corporate classification code. At all times the patent staff, the inventors and committee members preferably may access the system to obtain information as to the status of the system.

Figure 4:
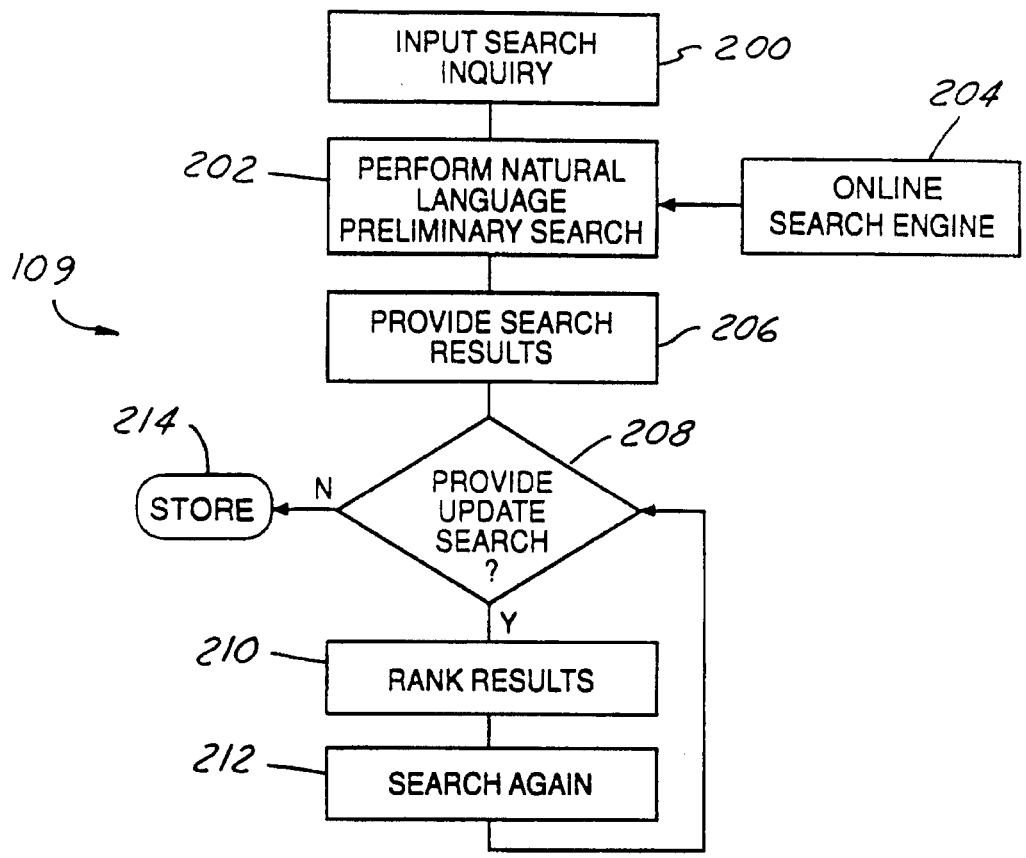
FIG. 4 is a flow chart of a search process according to the present invention.

Referring now to FIG. 4, step 109 is illustrated in further detail. In step 109, an optional search function may be included with the on-line invention disclosure system. The search is provided to give evaluators the state of the art to assist in their evaluation. A search inquiry is formulated in step 200. The search inquiry may be manually entered or search terms may be derived from the disclosure itself. Boolean searching may be performed. Preferably, natural language searching may be performed from using selected sections of the invention disclosure that may include a detailed description section or the problem/solution section. Also, the user may be prompted to enter search terms to be used in addition to the disclosure information. Various types of natural searching language engines may be used. Typically, these natural language search engines rank the various terms of the search inquiries such as the portions of the invention disclosure and perform a search through various on-line search engines from various search vendors through a natural language search as shown in step 202. On-line search engines 204 provide the results of the search to the user. This preferably is a required step although the on-line disclosure system may make this step optional. The on-line search engine may include, for example, interfacing with the patent office website, or various other commercial searching websites known to those skilled in the art. Many corporations subscribe to a commercial search service vendor. In step 204, the results of the search are provided to the inventor. The results may, for example, provide the top ten results from the search. In step 208, the inventor may be prompted to provide a narrower search. In step 208 the search may be refined using the various terms received from the documents of the first search or previous searches and the search terms from the disclosure document. For example, various documents can be selected as being on point and the wording from these documents may be weighted in addition to the prior search in step 210. The invention disclosure information may then be searched again in step 212 in view of the revised terms. Referring back to step 208, if an updated search is not desired to be entered then step 214 is executed wherein the search process is ended.

Figure 5:
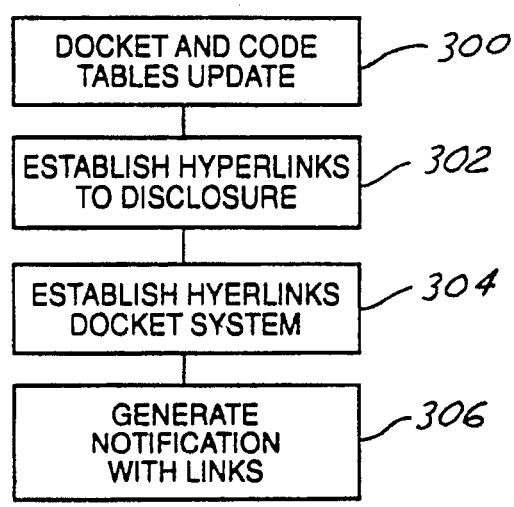
FIG. 5 is a flow chart of a docket system according to the present invention.

Referring now to FIG. 5, the invention disclosure system may also be coupled to an on-line docket system. Various information may be shared between the docket system and the on-line invention disclosure system. For example, common information such as a date stamp may be provided as well as other information not limited to the title, the classification code, inventor name, an inventor acknowledgement and an assignment. This information may be provided to the docketing system in step 300. Upon approval, for example, the docketing system may provide a docket number to the disclosure system as mentioned above. In step 302, hyperlinks may be established to the disclosure for use by the various committees, the patent staff evaluator, and the inventors. This hyperlink may also require the establishment of a password to enter the system and access the particular disclosure. Preferably, each inventor only has access to their own disclosures. Patent committee members preferably have access to all disclosures that have been submitted by the various inventors whose area of technology (corporate classification code) is within that of the particular committee. Hyperlinks may be established to the docket system in step 304. Various notifications may be provided to the inventors and the patent committee members through E-mails or otherwise with various hyperlinks to the sites in step 306.

While particular embodiments of the invention have been shown and described, numerous variations alternate embodiments will occur to those skilled in the art. Accordingly, it is intended that the invention be limited only in terms of the appended claims.

What is claimed is:

1. A method of forming a pre-patent application invention disclosure comprising:
  at one or more computers,
    forming a pre-patent application invention disclosure online by entering a plurality of selected pre-patent application invention information portions into a web-based system,
    storing each of the pre-patent application invention information portions in a central storage location,
    allowing access to users comprising at least one inventor of the pre-patent application invention disclosure for reviewing the pre-patent application invention information portions,
    obtaining from each of a plurality of inventors an approval of a same version of the pre-patent application invention disclosure,
    associating with the pre-patent application invention disclosure an approval log indicating that each of the inventors has reviewed and approved the same version of the pre-patent application invention disclosure, and
    allowing on-line access to a status of the pre-patent application invention disclosure.

2. The method as recited in claim 1 wherein the forming includes providing identification information, whereby upon providing identification information to the web-based system, retrieving user information from a directory system in response to the identification information.

3. The method as recited in claim 1 further comprising prompting one of the users for classification information classifying the pre-patent application invention disclosure into a technology area.

4. The method as recited in claim 3 further comprising selecting an evaluator based on the classification information and prompting an evaluation from the evaluator.

5. The method as recited in claim 4 wherein the prompting an evaluation from the evaluator comprises generating an e-mail and providing a hyperlink to the pre-patent application invention disclosure in the e-mail.

6. The method as recited in claim 4 wherein the prompting an evaluation comprises scheduling an evaluation meeting.

7. The method as recited in claim 4 wherein the prompting an evaluation comprises ranking the pre-patent application invention disclosure.

8. The method as recited in claim 3 further comprising notifying a patent staff person in response to the classification information.

9. The method as recited in claim 8 further comprising prompting a patentability review from the patent staff person.

10. The method as recited in claim 1 wherein the central storage location comprises a database coupled to a web server.

11. The method as recited in claim 1 further comprising identifying co-authors and notifying the co-authors of a disclosure with their name associated therewith in the web-based system.

12. The method as recited in claim 11 wherein the notifying comprises generating an e-mail having a hyperlink therein.

13. The method as recited in claim 1 wherein the status is provided update via e-mail.

14. The method as recited in claim 1 wherein the allowing access comprises prompting the users for a password.

15. The method as recited in claim 1 further comprising accepting a paper submission, wherein the forming comprises scanning the paper submission into a database.

16. An invention disclosure system comprising:
  at least one user computer accessible by a plurality of inventors;
  a server coupled to the at least one user computer; and
  the server providing user screens to the at least one user computer to prompt the inventors to provide pre-patent application disclosure information to the server, receiving the pre-patent application disclosure information from the inventors, storing the pre-patent application disclosure information, allowing access to the pre-patent application disclosure information after the storing, prompting the plurality of inventors for pre-patent application disclosure information approval, obtaining from each of the plurality of inventors an approval of a same version of the pre-patent application disclosure information, and associating with the pre-patent application disclosure information an approval log indicating that each of the inventors has reviewed and approved the same version of the pre-patent application disclosure information.

17. The system as recited in claim 16 further comprising a directory system coupled to the server whereby upon proving identification information to the server, the server retrieves user information from the directory system in response to the identification information.

18. The system as recited in claim 16 wherein the server comprises a web server.

19. The system as recited in claim 16 wherein the user computer comprises a web browser for accessing the server.

* * * * *